United States Patent [19]

Stephenson

[11] Patent Number: 5,515,259

[45] Date of Patent: May 7, 1996

[54] INDUCTIVELY CHARGED COAXIAL CAPACITOR ACCELERATOR

[75] Inventor: Kenneth E. Stephenson, Newtown, Conn.

[73] Assignee: Schlumberger Technology Corporation, New York, N.Y.

[21] Appl. No.: 928,003

[22] Filed: Aug. 11, 1992

[51] Int. Cl.⁶ .................................................. H02M 7/25
[52] U.S. Cl. ................................. 363/59; 361/329
[58] Field of Search .................. 363/59, 60, 61; 361/320, 321, 328, 329, 330; 328/233, 227; 315/111.01

[56] References Cited

U.S. PATENT DOCUMENTS

| | | | |
|---|---|---|---|
| 3,581,106 | 5/1971 | Peoples et al. | 307/150 |
| 3,602,827 | 8/1971 | Peoples et al. | 328/233 |
| 3,757,140 | 9/1973 | Gurwicz et al. | 307/252 M |
| 3,900,788 | 8/1975 | Behn et al. | |
| 3,902,108 | 8/1975 | Sion | |
| 4,298,902 | 11/1981 | Weigel et al. | 361/328 |
| 4,320,446 | 3/1982 | Langford et al. | 363/59 |
| 4,389,703 | 6/1983 | Morel et al. | 363/61 |
| 5,124,658 | 6/1992 | Adler | 328/233 |
| 5,191,517 | 3/1993 | Stephenson | 363/59 |

FOREIGN PATENT DOCUMENTS 1492395  6/1974  United Kingdom .

OTHER PUBLICATIONS

D. A. Bromley, "The development of electrostatic accelerators," *Nuclear Instruments and Methods,* 122 (1974), pp. 1–34.
M. M. A. Salama et al., "Design of field–controlled multi-layer insulation system," *IEEE Transactions on Electrical Insulation,* vol. E1–21, No. 2, Apr. 1986, pp. 165–174.
*Transformers for Electronic Circuits,* 2nd Edition, by Nathan R. Grossner, McGraw-Hill Book Company, 1983.

*Primary Examiner*—Peter S. Wong
*Assistant Examiner*—Adolf Berhane
*Attorney, Agent, or Firm*—Leonard W. Pojunas

[57] ABSTRACT

A high voltage DC source for a particle accelerator is an inductively charged, coaxial nest of capacitors. The nest of capacitors comprises coaxial tubes of insulation, one inside the next, and an inductive coil. The inductive coil is wound in several layers between the tubes of insulation. The nest of capacitors is inductively charged by a high turns ratio transformer. The transformer's primary coil is wound the length of the accelerator outside the nested capacitors. The transformer's secondary coil comprises the inductive coil layered between the tubes of insulation. Diodes in series with the secondary coil produce the DC signal of the source.

19 Claims, 2 Drawing Sheets

INDUCTIVELY CHARGED COAXIAL CAPACITOR ACCELERATOR

FIELD OF THE INVENTION

The invention concerns an electrostatic particle accelerator. More specifically, the invention concerns a particle accelerator having coaxial capacitors which are inductively charged.

The invention relates to an electrostatic particle accelerator described in copending U.S. patent application Ser. No. 7/568,924 and a U.S. Divisional application Ser. No. 899,978 based on it, for an Electrostatic Particle Accelerator Having Linear Axial and Radial Fields. U.S. patent application Ser. No. 7/568,924, its divisional application and this application are assigned to the same assignee.

BACKGROUND OF THE INVENTION

Charged particle accelerators used in well-logging generally produce secondary beams of uncharged particles, such as neutrons and photons which effectively penetrate the borehole formation. Such charged particle accelerators are discussed in the background portion of U.S. patent application Ser. No. 7/568,924 and its divisional application. That application also describes an apparatus having a particle source, a voltage supply, and a Cockcroft-Walton voltage multiplier. The voltage multiplier comprises a nested bank of capacitors arranged radially relative to one another to multiply a voltage signal. A linear voltage increase occurs between the capacitors such that voltages of 300 kV are obtainable. The apparatus also includes an accelerator tube that is biased by the multiplied voltage signal.

U.S. Pat. No. 5,124,658 to Adler concerns a Nested High Voltage Generator/Particle Accelerator. The accelerator includes a plurality of high voltage generators nested within one another. Each voltage generator comprises a cup-like housing having a base and a tubular sleeve. A primary transformer winding encircles the nested stack. A secondary transformer winding is between each adjacent pair of housings. A power supply, respective to each of the secondary windings, converts alternating voltage from its respective secondary winding to DC voltage. Specifically, each secondary winding drives a miniature voltage multiplier comprising a capacitor-diode combination which provides the DC voltage for the corresponding generator from an AC input. However, this approach results in difficulties with voltage standoff in the secondary windings and in the voltage multipliers because of the high gradients associated with miniature size.

SUMMARY OF THE INVENTION

The invention concerns a DC source which comprises cylindrical coaxial members of insulation, and an inductive coil wound in layers between the members of insulation. In a preferred embodiment, the inductive coil and members of insulation comprise a nested bank of capacitors, the inductive coil inductively charges the nested bank of capacitors, and the inductive coil comprises electrodes of the nested bank of capacitors.

ADVANTAGES

This invention inductively charges a nested bank of capacitors, in such a way that the charging mechanism is distributed over the entire device. High gradients associated with miniature size are avoided. The concept of this invention can be extended to higher voltages by increasing the number of stages. There is no fundamental limit to the voltage. Since the rectifiers for converting AC to DC are incorporated as part of the coil winding approach, no separate DC power supplies are needed.

In addition, the particle accelerator of this invention provides voltage grading such that the axial and radial electronic fields on the acceleration tube of the accelerator are approximately linear and provides higher voltages than devices without voltage grading, as is well known. When the accelerator tube of a particle accelerator is equipped with an ion source and target appropriate for neutron generation, higher neutron fluxes are obtained than with a non-voltage graded accelerator. Alternatively, when the electron tube is equipped with an electron gun and target appropriate for bremsstrahlung photon production, higher photon fluxes are obtained. With higher neutron fluxes, environmental effects can be reduced in a logging environment because of increased source to detector spacings; safety can be improved because isotopic neutron sources can be replaced; and statistical precision or logging speed can be improved. Similar advantages apply to photon production. The particle accelerator of this invention is able to fit in a borehole for logging a formation. In a geometry of concentric coaxial cylinders the dielectric is very well constrained and electromechanical breakdown is not substantial.

DETAILED DESCRIPTION

Figure 1:
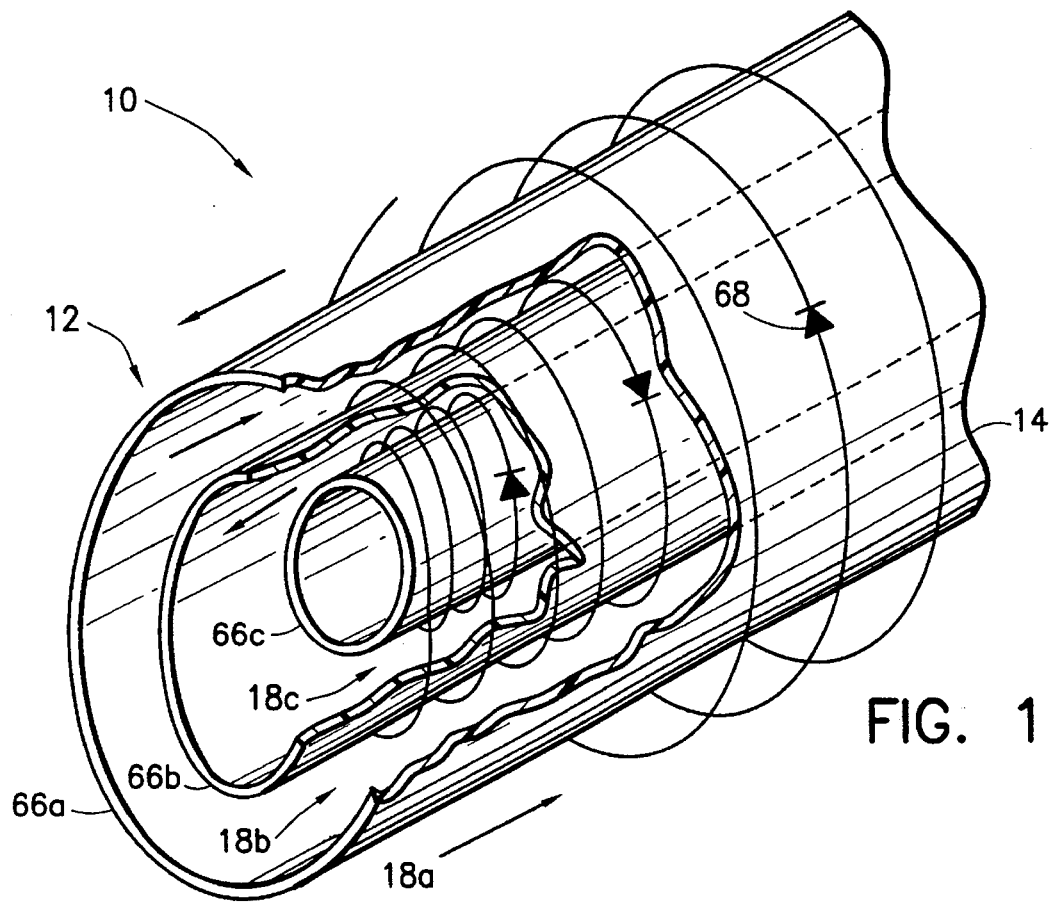
FIG. 1 is a schematic diagram in perspective view of the voltage multiplier of this invention.

FIG. 1 is a perspective view, schematic diagram of the voltage multiplier portion 10 of an inductively charged coaxial capacitor accelerator 50 (see FIG. 2) according to this invention. The voltage multiplier 10 comprises a high voltage DC source for the particle accelerator of FIG. 2. According to the invention, the voltage multiplier 10 is an inductively charged, coaxial nest of capacitors 12. The nest of capacitors 12 comprises coaxial tubes 66a–c of insulation, one inside the next, and electrodes comprising an inductive coil 14. The inductive coil 14 is wound in several layers between the tubes of insulation 66. Each tube of insulation 66 comprises a teflon tube, or a rolled sheet of teflon which is seamed with insulating tape, for example. The nest of capacitors 12 is inductively charged by a high turns ratio transformer. The transformer's primary coil (16 of FIG. 2) is wound the length of the accelerator 50 outside the nested capacitors 12. The transformer's secondary coil comprises the inductive coil 14 layered between the tubes of insulation 66. Diodes 68 in series with the secondary, inductive coil 14 divide the coil 14 into segments and together produce the DC signal of the source. The layers of the secondary coil 14 have opposite helicity. That is, the turns of the coil 14 are always in the same direction: clockwise as viewed in FIG. 1, for example, but coiled onto a first tubular member 66a in one direction, left-to-right, and then in the opposite direction, right-to-left, for example. This enables a steady increase in DC voltage from the outermost layer to the innermost layer. The last segment of each layer is connected the next, smaller radius layer by means of a small wire (not shown).

The primary coil 16 (of FIG. 2) is wound on the outside of the outermost tubular member along its length. The primary coil 16 is energized by an oscillatory source as a primary driver to produce an electromagnetic field. The electromagnetic field in turn induces a current in the secondary coil 14 in the manner of a transformer. The secondary, inductive coil 14 is wound about successive tubular members 66a–c in layers such that the inductive coil 14 and tubular members 66a–c have the same longitudinal axis. Accordingly, each layer of the coil 14 comprises an electrode 18a–c between the insulating tubular members 66a–c. The alternating layers of electrodes 18a–c comprising the inductive coil 14, and dielectric material comprising the insulating tubular members 66a–c form a nested bank of inductively driven capacitors. Each capacitor stage of the nested bank stores the DC energy and multiplies the voltage of the prior stage, starting with the original signal voltage applied to the primary coil 16 according to this invention. The operation of this voltage multiplier relative to a particle accelerator is described below.

Figure 2:
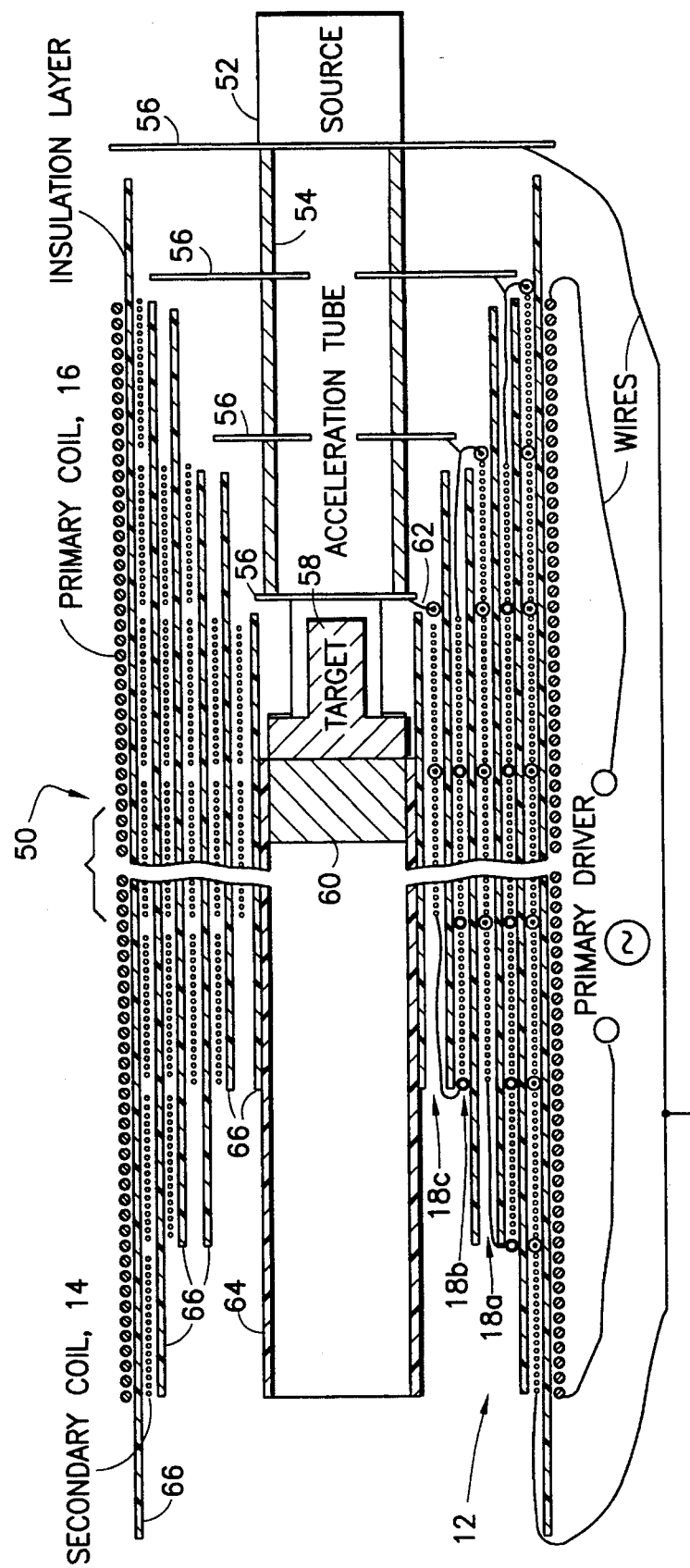
FIG. 2 is a cross-sectional schematic diagram of an inductively charged coaxial capacitor accelerator according to this invention.

FIG. 2 is a schematic diagram of a particle accelerator 50 according to this invention. A particle source 52, such as an ion source, generates particles axially toward an acceleration tube 54. Increasing voltage at successive rings 56 of the acceleration tube 54 accelerate the particles toward a target 58. A brass plug 60 connects to the target 58 and closes a non-conductive tube 64. The non-conductive tube 64 contains a coolant for the target 58, such as Fluorinert. The non-conductive tube 64 also provides support for the particle accelerator 50 of this invention, as described below. Surrounding the non-conductive tube 64 is a layered capacitive bank 12, a diode matrix 68, and a layered inductive coil 14. The layered inductive coil 14 connects to ground.

According to this invention, the capacitors of the bank 12 are arranged radially relative to and are nested within one another. This arrangement provides a particle accelerator 50 having linear voltage increases in the axial and radial directions. The axial direction follows the beam of accelerated particles. The radial direction is perpendicular to the axial direction. According to this invention, the voltage exterior to the device is no greater than the signal voltage. A linear voltage increase occurs between stages of the acceleration tube 54 due to the equal spacing of the rings 56 that comprise the acceleration tube 54 and the equal bias voltages that are applied to the rings 56. A linear voltage increase occurs between capacitive stages of the capacitor bank 12 due to the set number of turns in each layer of the layered inductive coil 14. There is an equal dielectric thickness for each capacitive stage.

The acceleration tube 54 comprises 4 axially arranged rings 56 of Kovar, for example. Capacitor bank 12 substantially surrounds rings of the acceleration tube 54. Each ring connects to a corresponding single capacitor of the capacitive bank 66 such that an innermost ring connects to the innermost electrode 18c. The rings 56 are biased by successively higher voltages from the capacitor bank 12 such that the highest voltage is generated at the smallest, innermost ring. In this manner, particles from the source 52 are accelerated toward the target 58. In the case of a neutron generator, the source 52 is an ion source, in the case of an x-ray, the source 52 is an electron gun.

The target 58 is copper and is coated on its face with titanium in the case of a neutron generator, and is covered with a tungsten button in the case of an x-ray generator. The target 58 connects to the brass plug 60, which seals one end of the non-conductive tube 64. A liquid dielectric 74, such as Fluorinert, provides cooling, high voltage insulation, fills any gaps in the capacitors of the capacitor banks 66, and increases capacitance values of the layers of each bank. The entire particle accelerator 50 is typically surrounded by Fluorinert that is contained in a housing. Since no high voltage appears exterior to the particle accelerator 50, insulation requirements between the accelerator and housing are modest.

The voltage produced by each stage is approximately 30 kV. The tubular members 66a–c of insulating material comprise FEP Teflon, Kapton, or polyphenylene sulfide, for example, between which the inductive coil has been wound. The layers of the inductive coil comprise electrodes of each nested capacitor. Fine, 0.008" diameter nickel wires 78 connect the inductive coil of the capacitor bank 12 to a corresponding single ring 56 of the acceleration tube 54. The layers of the inductive coil 14 function as plates of the succeeding capacitors. The axial length of the plates decreases as one goes radially inward. This makes the leakage path to grounds longer. A ten-stage acceleration tube would provide 300 kV. By using two power supplies of opposite polarity, operation of an x-ray or neutron tube at 600 kV should be possible.

The innermost (highest voltage) coil layer is mated to the target 58 by a wire such that the face of the target 58 is recessed from that electrode. In this way, there is essentially no radial electric field at the target surface. Each electrode extends farther toward the ion source 26 (i.e., axially) than its smaller radius neighbor. By properly choosing the axial extent of the electrodes, the high radial electric field between the electrodes is transformed into an essentially linear axial field in the beam and target region.

Figure 3:
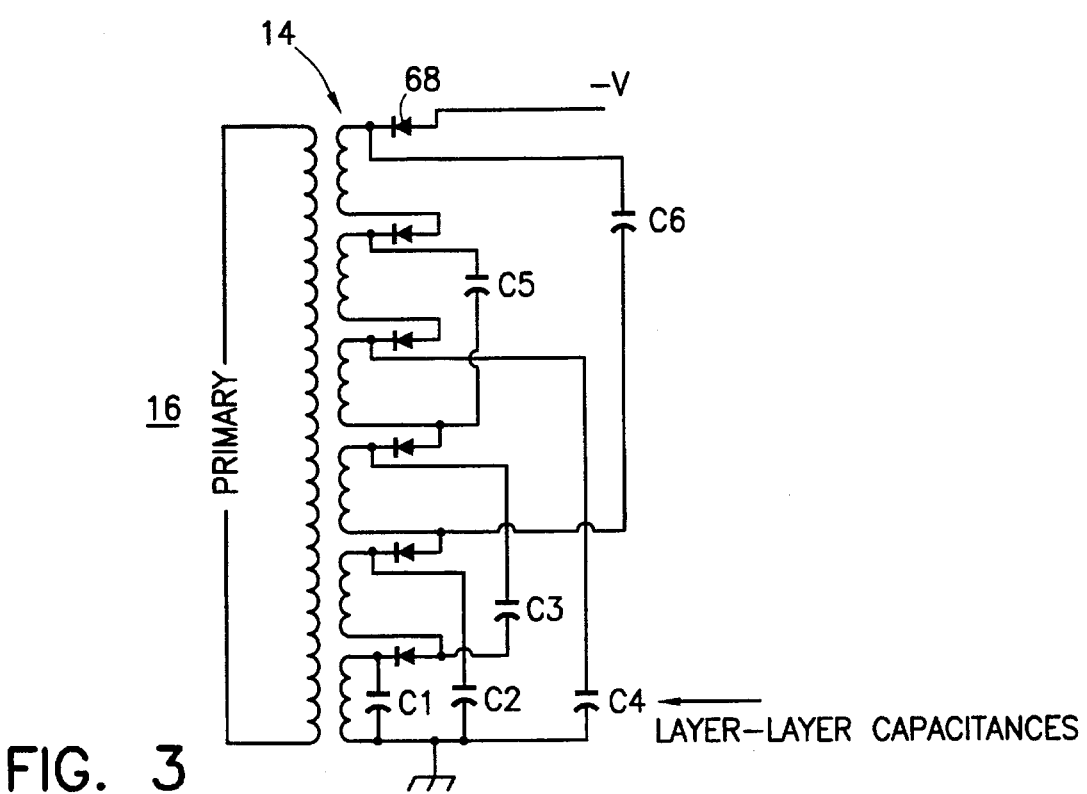
FIG. 3 is a schematic diagram illustrating the circuitry of the voltage multiplier portion of FIG. 1.

FIG. 3 is a schematic diagram illustrating the circuitry of the voltage multiplier portion of FIG. 1. The equivalent electrical circuit is for a three layer transformer. Each layer in this example is assumed to be composed of two winding segments, connected by high voltage diodes. The windings and diodes form a cascaded secondary HV DC power supply with the exception of the location of the capacitors. The capacitors are not discrete elements but are instead due to the inherent capacitance of the layer to layer construction. The voltage multiplier of this invention is essentially a series cascade of half-wave rectifiers. C1 represents the capacitance of neighboring coil turns on the same layer. This capacitance appears at all layers of the inductive coil. C2 represents the capacitance of adjacent windings on the same layer, separated by a diode. C3, C4, C5 and C6 represent capacitances between adjacent layers. In general, there is a capacitance between each winding segment and every other winding segment. (Not all capacitances are shown in FIG. 3). All capacitances except those represented by C1 serve to store charge, and function as a charge reservoir which supplies the load. On each cycle, the transformer windings and diodes conduct to replenish capacitor charge lost to the load. The effective shunt capacitance, C, of the secondary, inductive coil is estimated to be 75 pf. The charge taken from C during each cycle must be small compared to the total charge stored in the C. Otherwise, unacceptable ripple in the output voltage will occur.

AN EXAMPLE

As an example, the concept of the invention is applied to the construction of a 300 kV accelerator. The accelerator comprises 10 tubular layers, each layer 0.030" thick and generating 30 kV DC. The innermost layer has a diameter of 1.0" and the outermost layer has a diameter of 1.6". Because the inner layers have smaller radii and intercept less flux from the primary drive coil, more turns of the secondary coil will be needed to give the same voltage as the outer layers. Assuming a maximum turn-to-turn voltage of 15 volts in the secondary coil, then the outermost layer requires approximately 2000 turns and the innermost layer requires 4500 turns. If 0.004" diameter wire is used for the secondary coil, then the coil winding in the innermost layer is approximately 18' long. The winding for each layer comprises six segments with diodes interconnecting the segments. Each segment of the innermost layer is 3" long and each diode carries 5 kV. The next layer larger in radius must be slightly longer in axial length, for example 0.25" on each end, to provide the desired linear axial field shaping and the turn-to-turn spacing must be increased also to achieve a uniform distribution of turns over the length of the layer. The outermost winding is approximately 2000 turns comprising six segments separated by the 5 kV diodes over a length of approximately 25".

Because of the large mutual inductance between segments of the secondary, the secondary is self-resonant in the kHz range. To achieve good efficiency, the primary excitation will be synchronous with the resonant frequency of the secondary and operate over a small phase angle. Shunt capacitance for the secondary is estimated to be approximately 75 pF, which indicates a ripple of less than 1 kV for a 100 µA load and a resonant frequency of 10 kHz.

MODIFICATIONS

The capacitor banks are biased with a negative polarity to accelerate positive ions for neutron generation, and with a positive polarity for x-ray generation. A tandem approach is also possible. In this case, the source generates negative ions, which are accelerated to a voltage V. A carbon foil strips away the electrons to produce a positive charge. The positive charge is then accelerated through a symmetric system to ground. Wire grids over apertures in the rings of the acceleration tube could be used to focus the accelerated particles onto the target. Diode placement depends on the voltage rating of the diode. The higher the voltage rating, the longer the segments of the inductive coil can be, with a resulting tradeoff in size of the diodes. The tubular members need not be graduated in length. To compensate for equal length tubular members, the spacing between the members and the number of windings must be adjusted for each capacitor. More coil turns would be required for the inner capacitors than for the outer capacitors to receive a greater amount of flux form the primary coil.

We claim:

1. An apparatus including:
   a means for supplying a voltage signal; and
   a voltage multiplier that multiplies the voltage signal and includes a bank of radially arranged capacitors, the capacitors having layers which are substantially tubular and comprise an outer capacitor and at least one inner capacitor, such that the inner capacitor is nested within and surrounded by the outer capacitor, and an inductive device adjacent the radially arranged capacitors for providing an electromagnetic field which inductively charges the radially arranged capacitors.

2. The apparatus of claim 1, wherein the bank of capacitors is a plurality of tubular members of insulation and the charging means is an inductive coil wound between the layers of insulation, the inductive coil comprises electrodes of the capacitors, and the tubular members of insulation comprise a dielectric material between the electrodes.

3. The apparatus of claim 2 wherein the tubular members of insulation have increasing axial lengths such that the innermost tubular member has the smallest axial length.

4. The apparatus of claim 3, wherein the inductive coil is wound in plural layers having different diameters, and layers of the coil are separated from one another by the tubular members of insulation.

5. The apparatus of claim 4, the inductive coil comprising a secondary coil, the apparatus including a primary coil around the outermost tubular layer, the primary and secondary coil comprising a transformer.

6. The apparatus of claim 1 comprising a means for generating charged particles which further includes:
   a source means for producing atomic particles;
   an accelerator means biased by the multiplied voltage signal for accelerating particles from the source means such that a voltage exterior to the apparatus is no greater than the signal voltage.

7. The apparatus of claim 6, wherein the bank of capacitors is a plurality of tubular members of insulation and the charging means is an inductive coil wound between the layers of insulation, the inductive coil comprises electrodes of the capacitors, and the tubular members of insulation comprise a dielectric material between the electrodes.

8. The apparatus of claim 7 wherein the tubular members of insulation have increasing axial lengths such that the innermost tubular member has the smallest axial length.

9. The apparatus of claim 8, wherein the inductive coil is wound in plural layers having different diameters, and layers of the coil are separated from one another by the tubular members of insulation.

10. The apparatus of claim 9, the inductive coil comprising a secondary coil, the apparatus including a primary coil around the outermost tubular layer, the primary and secondary coil comprising a transformer.

11. A DC source comprising:
    cylindrical, coaxial members of insulation;
    an inductive coil which carries a first signal and is wound in layers between the members of insulation such that the inductive coil and members of insulation comprise a nested bank of capacitors arranged radially relative to one another, the capacitors having layers which are substantially tubular and comprise an purer capacitor and at least one inner capacitor, such that the inner capacitor is nested within and surrounded by the outer capacitor; and
    a means which is connected to the inductive coil and is positioned between members of insulation for rectifying the first signal into a DC signal.

12. The DC source of claim 11, wherein:
    the inductive coil comprises a means for inductively charging the nested bank of capacitors; and
    the inductive coil comprises electrodes of the nested bank of capacitors.

13. The DC source of claim 12, the layers of the inductive coil having different sizes and arranged between coaxial members of insulation in increasing size such that an innermost layer is the smallest layer.

14. The DC source of claim 13, the members of insulation arranged to have an increasing axial length such that an innermost member of insulation has the smallest axial length.

15. The DC source of claim 14, the means for rectifying comprising a bank of diodes which individually connect in series with the inductive coil, wherein the inductive coil and bank of diodes are connected in series and comprise a means for providing a DC signal.

16. The apparatus of claim 15, wherein the bank of capacitors is a plurality of tubular members of insulation and the tubular members of insulation comprise a dielectric material between the electrodes.

17. The apparatus of claim 16, wherein the inductive coil is wound in plural layers having different diameters, and layers of the coil are separated from one another by the tubular members of insulation.

18. The apparatus of claim 17, the inductive coil comprising a secondary coil, the apparatus including a primary coil around the outermost tubular layer, the primary and secondary coil comprising a transformer.

19. An apparatus including:

a) a means for supplying a voltage signal;

b) cylindrical coaxial member of insulation;

c) an inductive coil which carries a current signal and is wound in layers between the members of insulation such that:

(i) the inductive coil and members of insulation comprise a voltage multiplier which multiplies the voltage signal; and (ii) the inductive coil and members of insulation comprise a nested bank of capacitors arranged radially relative to one another, the capacitors being substantially tubular and comprising an outer capacitor and at least one inner capacitor nested within and surrounded by the outer capacitor;

wherein the inductive coil comprises a means for inductively charging the nested bank of capacitors and also comprises electrodes of the nested capacitors; and d) a means connected to the inductive coil and positioned between the members of insulation for rectifying the current signal to a DC signal.

* * * * *